United States Patent [19]

Stern

[11] Patent Number: 5,749,495

[45] Date of Patent: May 12, 1998

[54] DISPENSER FOR DISPENSING TWO LIQUID PRODUCTS

[75] Inventor: Leif Einar Stern, Lomma, Sweden

[73] Assignee: Aspect International AB, Lund, Sweden

[21] Appl. No.: 654,245

[22] Filed: May 28, 1996

[30] Foreign Application Priority Data

May 30, 1995 [SE] Sweden ................................. 9501968

[51] Int. Cl.$^6$ ........................................................ B67D 5/60
[52] U.S. Cl. .......................... 222/134; 222/137; 222/144.5; 222/145.3; 222/162; 222/309; 222/434; 222/441; 222/449; 222/472; 222/481; 222/518
[58] Field of Search ........................ 222/134, 135, 222/137, 144.5, 145.3, 162, 191, 309, 465.1, 470, 472, 481, 518, 434, 441, 449

[56] References Cited

U.S. PATENT DOCUMENTS

| | | | |
|---|---|---|---|
| 3,492,876 | 2/1970 | Bull et al. | 222/309 X |
| 3,718,234 | 2/1973 | Bagguley | 222/144.5 X |
| 4,413,972 | 11/1983 | Lawson | 222/518 X |
| 5,390,824 | 2/1995 | Vassiliou | |
| 5,462,203 | 10/1995 | Stern | 222/145.3 X |
| 5,645,195 | 7/1997 | Belshaw et al. | 222/472 X |

FOREIGN PATENT DOCUMENTS

| | | |
|---|---|---|
| A-0 427609 | 5/1991 | European Pat. Off. |
| A-0 520315 | 12/1992 | European Pat. Off. |
| 0 610 724 A2 | 1/1994 | European Pat. Off. |
| A-0649682 | 4/1995 | European Pat. Off. |

Primary Examiner—Joseph Kaufman
Attorney, Agent, or Firm—McCormick, Paulding & Huber

[57] ABSTRACT

The present invention relates to a dispenser for dispensing two liquid products. The dispenser permits feed-out of the viscous products either separately or together.

13 Claims, 6 Drawing Sheets

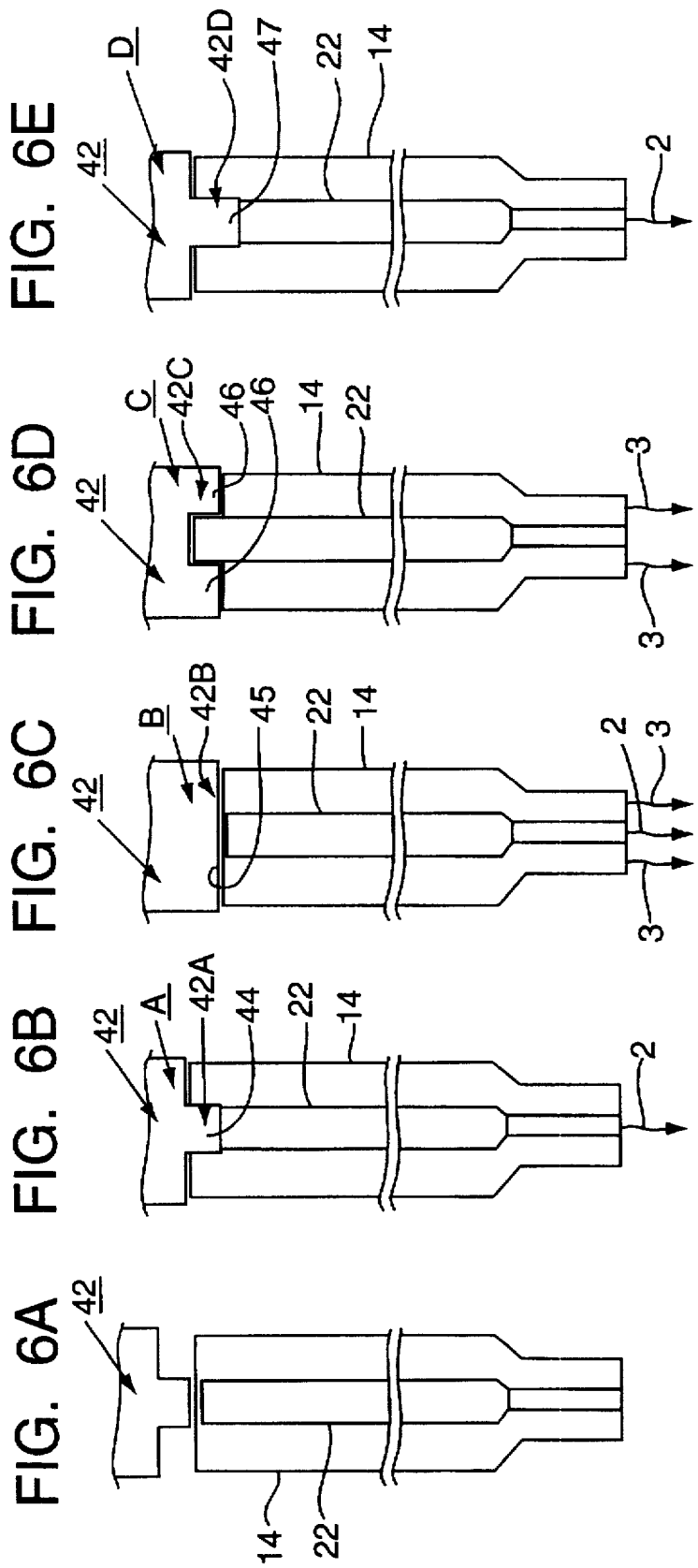

5,749,495

DISPENSER FOR DISPENSING TWO LIQUID PRODUCTS

BACKGROUND OF THE INVENTION

The present invention relates to a dispenser for dispensing two liquid products, which dispenser preferably is intended for manually feeding out at least a first and a second viscous product, preferably mustard and ketchup or similar liquid food products, on preferably food products such as hamburger bread rolls or the like, whereby a first container containing one liquid product includes a second container located therein, said second container containing the other liquid product, whereby the second container can be brought to effect dispensing movements by pressing it towards at least a first return means, whereby an outer sealing means is located on the second container, said sealing means being provided, when said second container is caused to effect dispensing movements, to feed out, while sealingly or tightly engaging the first container, such units of said one liquid product which have been gathered in an outer discharge space in said first container, whereby an inner piston, which is provided, when brought to effect dispensing movements, to feed out, while sealingly or tightly engaging the walls of a valve housing, such units of said other liquid product which have been gathered in a lower discharge or feed-out chamber in said valve housing, whereby the outer sealing means is provided, when the second container is caused to effect returning movements in a direction opposite to the dispensing movements, to let units of said one of the liquid products into the outer discharge or dispensing chamber, and whereby the inner piston and/or the valve housing are/is provided, when said inner piston is caused to effect returning movements in a direction opposite to said dispensing movements, to let units of said other liquid product into the discharge or feed-out chamber in said valve housing.

A dispenser of the above type is known from EP-A-0 610 724. The dispenser according to this specification however, lacks simple means for dispensing either only said one liquid product or only said other liquid product.

SUMMARY OF THE INVENTION

The object of the present invention therefore, has been to provide an improvement of the prior art dispenser in order to enable feed-out of one of the liquid products at a time.

In accordance with the present invention, a dispenser is disclosed for dispensing two liquid products, which dispenser preferably manually feeds out at least a first and a second viscous product, such as mustard and ketchup, on food products such as hamburger bread rolls or the like.

A first container contains one liquid product, and includes a second container located therein, which second container contains the other liquid product. The second container can be brought to effect dispensing movements by pressing it in a direction towards at least a first return means.

An outer sealing means is located on the second container and, when caused to effect dispensing movements, feeds or presses out such units of the one liquid product which have been gathered in an outer discharge space in said first container, while sealingly or tightly engaging the first container. An inner piston, when it is brought to effect dispensing movements, feeds or presses out such units of the other liquid product which have been gathered in a lower discharge or feedout chamber in said valve housing, while sealingly or tightly engaging the walls of a valve housing. When the second container is caused to effect returning movements in a direction opposite to the dispensing movements, the outer sealing means lets units of the one of the liquid products into the outer discharge or dispensing chamber. When the inner piston is caused to effect returning movements in a direction opposite to said dispensing movements, the inner piston and/or the valve housing let units of the other liquid product into the discharge or feed-out chamber in said valve housing.

The second container and the inner piston are movable relative to each other, and the second container may be subjected to dispensing movements without imparting dispensing movements onto the inner piston, so that only units of the one liquid product can be dispensed. The inner piston may be subjected to dispensing movements without imparting dispensing movements onto the second container, so that only units of the other liquid product can be dispensed.

The second container and the inner piston may be subjected to dispensing movements at the same time so that units of the one as well as the other liquid product can be dispensed simultaneously.

Since the dispenser has said characterizing features, it now has more dispensing functions than previously without any substantial increase of the number of members forming part thereof nor of the complexity of said members.

The invention will be further described below with reference to the accompanying drawings, in which

BRIEF DESCRIPTION OF THE DRAWINGS

FIG. 6A–6E schematically illustrate the motion transfer means of FIG. 5 in a neutral position and four other positions for dispensing said one and/or said other liquid product.

DETAILED DESCRIPTION OF THE PREFERRED EMBODIMENT

Figure 1:
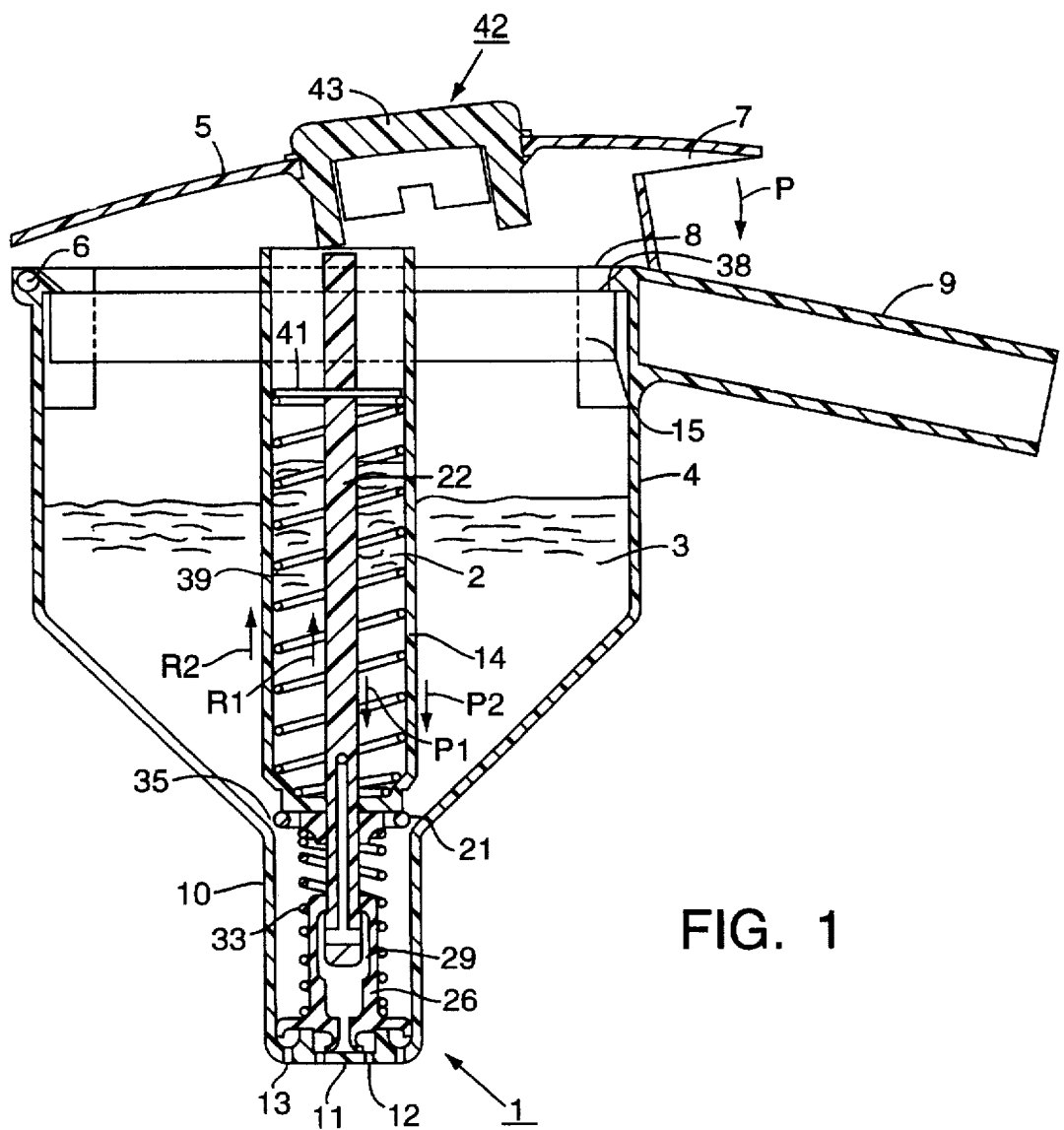
FIG. 1 is a vertical section of a dispenser according to the invention.

The dispenser 1 illustrated in the drawings is intended for dispensing or feeding out a first liquid product 2, preferably mustard, and a second liquid product 3, preferably ketchup. The dispenser 1 comprises a first container 4 which at the top has a dispensing handle 5 designed as a lid. Said handle is at the front pivotally mounted on the first container 4 through an axis 6 and can be brought to effect or perform dispensing movements (arrow P, FIG. 1) by being swung about said axis 6 in a direction towards the first container 4 until a rear member 7 thereof abuts upper members 8 of said first container 4.

The dispensing handle 5 can be operated by holding the first container 4 in a handle 9 protruding therefrom and pressing the thumb against the rear members of the dispensing handle 5.

The first container 4 tapers below into a discharge member 10 which in an outer end wall 11 is provided with discharge openings 12 for mustard 2 and discharge openings 13 for ketchup 3.

The dispenser 1 further comprises a second container 14 which is movably mounted in the first container 4 and the movements of which are controlled by means of control means 15 relative to said first container 4.

The second container 14 has a valve seat 20 and at outer sealing ring 21 for dispensing ketchup 3, while an inner piston 22 is provided to dispense or feed out mustard 2. This inner piston 22 protrudes downwardly from the second container 14 and has an enlarged end portion 23 down below. The inner piston 22 also has a throughflow passage 24 which via a longitudinal branch is connected at the top to the interior of the second container 14 and which via a transverse branch down below opens into lateral surfaces 25 of the enlarged end portion. The inner piston 22 projects from above into a valve housing 26 of elastic material so that the enlarged end portion 23 thereof is situated within said valve housing and movable in an upper throughflow chamber 27 in the valve housing 26 and in a lower discharge or feed-out chamber 28 connecting thereonto in the valve housing 26. The throughflow chamber 27 has a slightly larger diameter than the enlarged end portion 23 so that mustard 2 can flow from the interior of the second container 14 via the throughflow passage 24 and via a throughflow gap 29 defined by said throughflow chamber 27 down into the discharge or feed-out chamber 28. The feed-out chamber 28 however, has the same diameter as or a slightly smaller diameter than the diameter of the enlarged end portion 23 of the inner piston 22. This means that the enlarged end portion 23 and the valve housing 26 will tightly engage or bear against one another when the inner piston 22 is subjected to a dispensing or feed-out movement P1 and thereby pushed down into the feed-out chamber 28, whereby the valve housing 26 also will close the mouths of the throughflow passage 24. By reason of the sealing obtained between the enlarged end portion 23 and the valve housing 26 when the enlarged end portion 23 performs its dispensing movement P1 in the feed-out chamber 28, the mustard 2 contained in the feed-out chamber 28 will be pressed out of said chamber. At this feed-out, mustard 2 will be pressed against a check valve 30 so that said valve opens, whereupon mustard 2 will be forced out through the discharge openings 12 onto e.g. a hamburger bread roll H.

Figure 2:
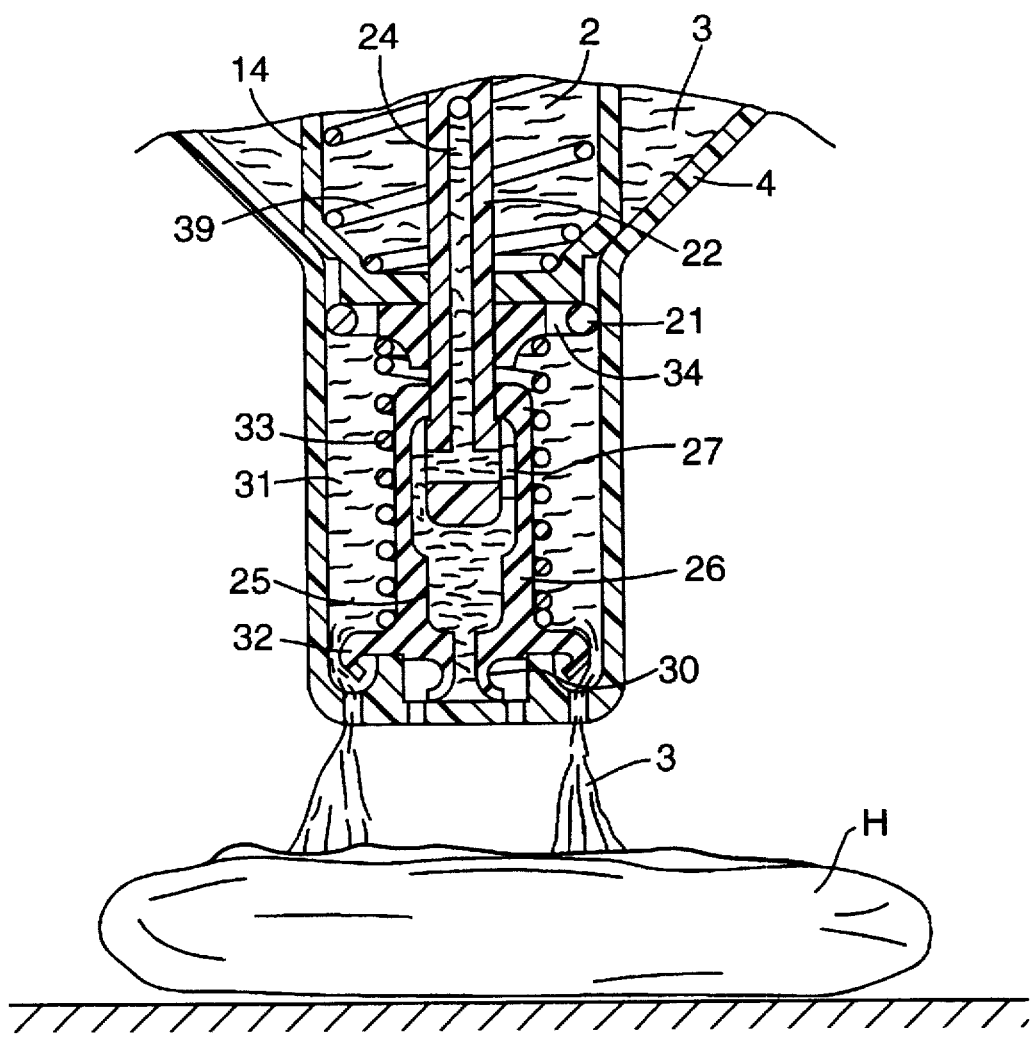
FIG. 2 is a vertical section of lower parts of the dispenser shown in FIG. 1 during dispensing of a liquid product.
Figure 3:
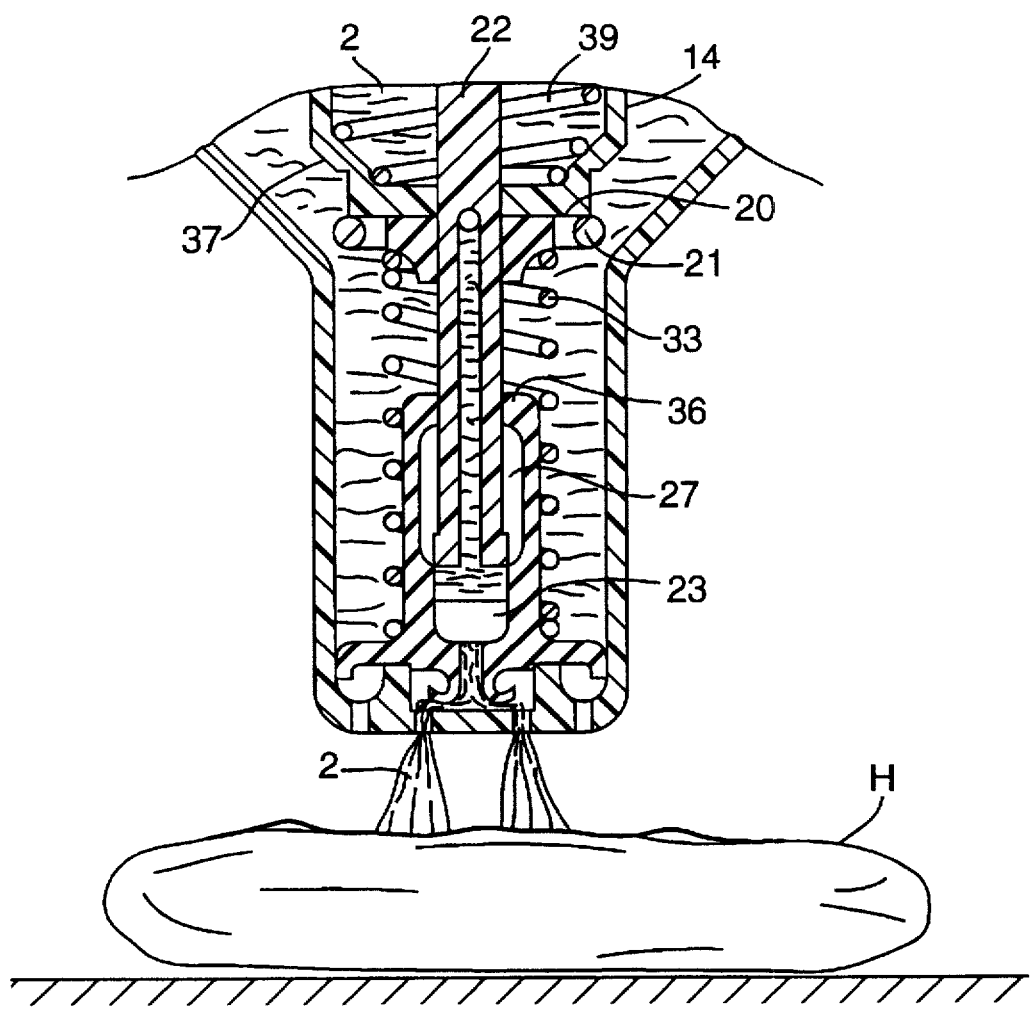
FIG. 3 is a vertical section of lower parts of the dispenser shown in FIG. 1 during dispensing of another liquid product.
Figure 4:
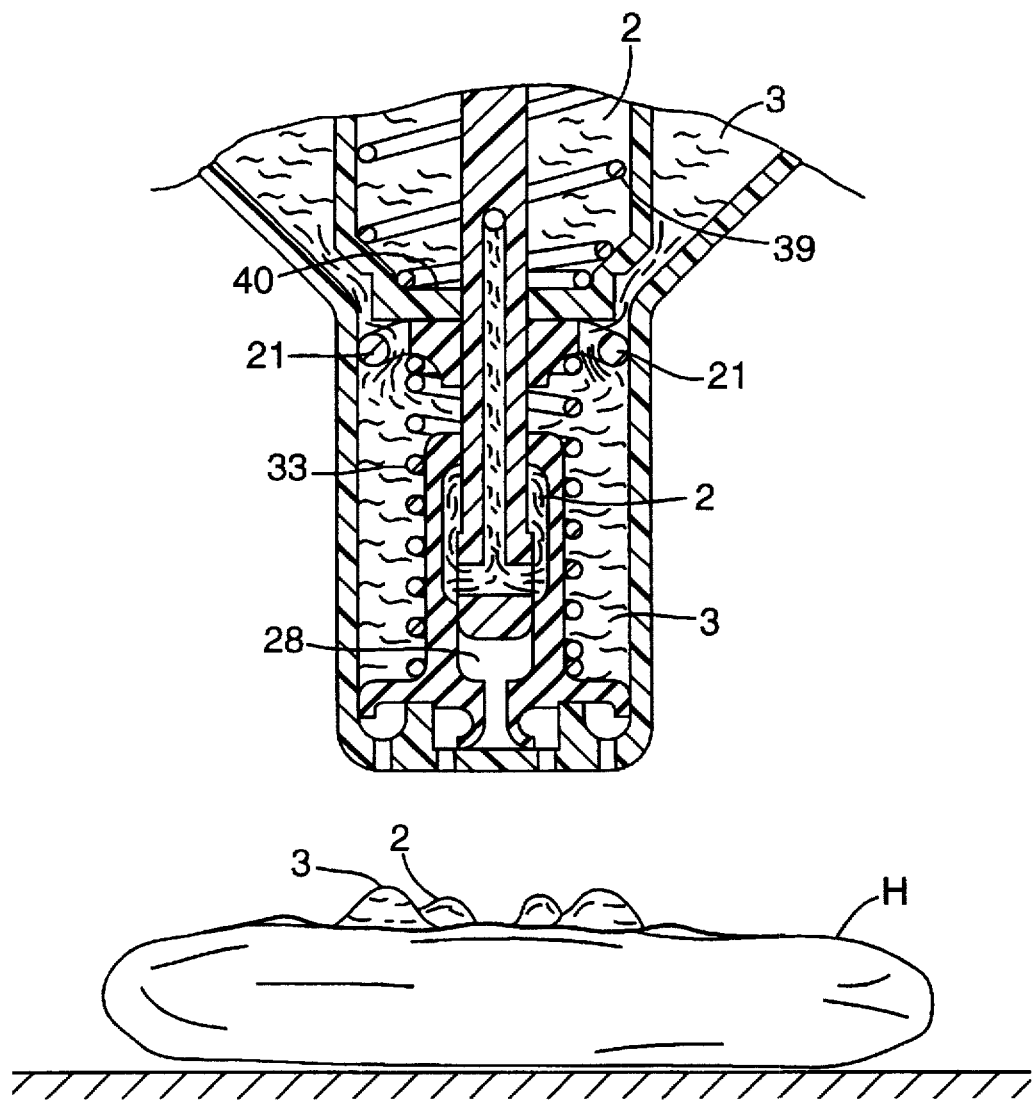
FIG. 4 is a vertical section of lower parts of the dispenser according to the invention during refilling of said parts of the dispenser.
Figure 5:
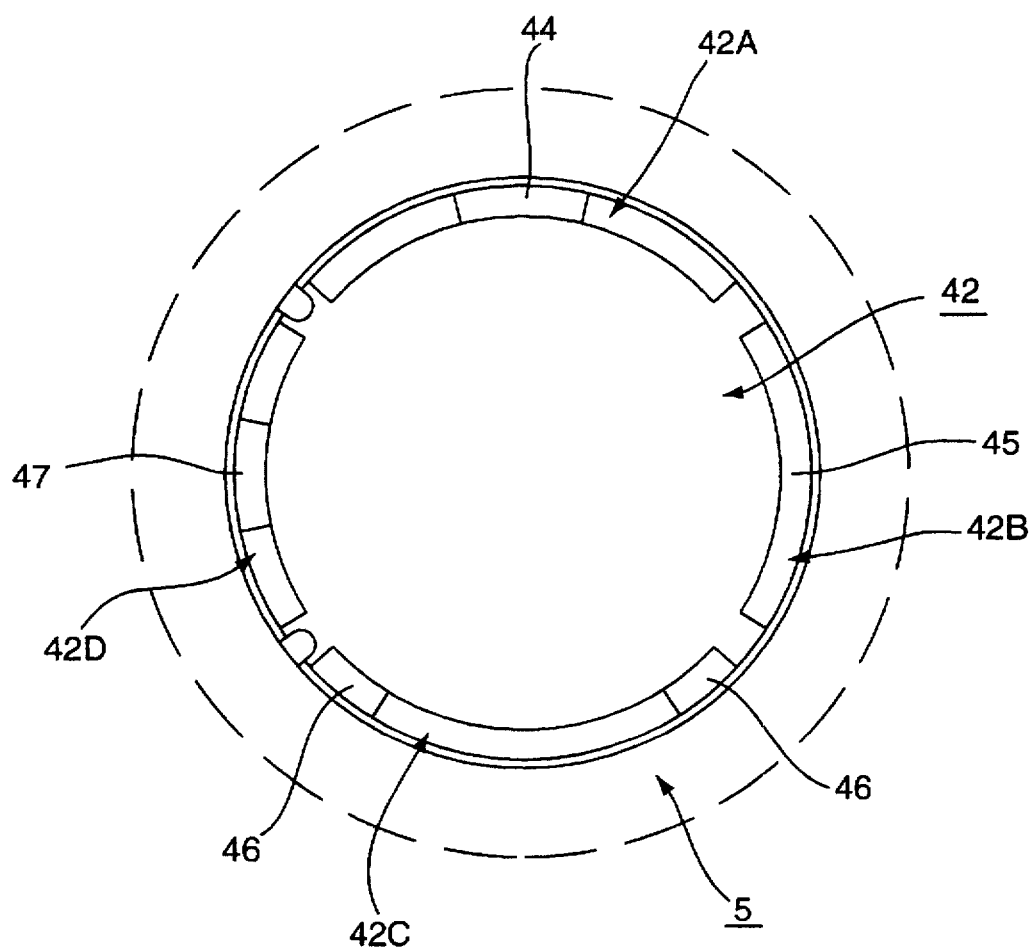
FIG. 5 is a plan view from below of a motion transfer means forming part of the dispenser of FIG. 1.

When the second container 14 is subjected to dispensing or feed-out movements P2, the outer sealing ring 21 will be moved downwards in the discharge member 10, whereby the sealing ring 21 will be pressed against its valve seat 20 and also sealingly slide along the inner side of the discharge member 10. Hereby, the connection between an outer dispensing chamber 31 and the upper parts of the first container 4 is closed. Ketchup 3 contained in the outer dispensing chamber 31 will thus be fed out of said chamber 31 by means of the outer sealing ring 21. During this feed-out, the ketchup 3 will be pressed against an outer check valve 32 so that said valve opens and allows ketchup to reach the discharge openings 13 through which it is fed out onto the hamburger bread roll H (see FIG. 2).

The dispensing movements P2 of the second container 14 take place against the action of a first return means 33 through which returning movements R2 are imparted to said second container 14. Hereby, the outer dispensing chamber 31 is filled with ketchup 3. This is arrived at while the outer check valve 32 returns to closed position when the pressure against said check valve ceases and while the outer sealing ring 21 during its upward movement against the ketchup 3 located above it is urged by the pressure from the ketchup to fold downwards, thereby leaving its valve seat 20 and/or its contact with the inner side of the discharge member 10. As the outer sealing ring 21 takes this shape, ketchup 3 from the upper parts of the first container 4 flows via openings 34 in the outer sealing ring 21 and/or via the gap arising between the outer sealing ring 21 and the inner side of the discharge member 10 down into the outer dispensing chamber 31. The outer sealing ring 21 furthermore may be so arranged that a gap 35 is formed between it and the inner side of the first container 4 when the second container 14 occupies its upper position. This will permit ketchup 3 to flow down into the outer dispensing chamber 31 after the second container 14 has occupied an upper position.

The outer sealing ring 21 is preferably formed in such a way and consists of, or is provided with, an elastic material and is fixedly attached to an end portion of the second container 14, and it functions as a check valve at the feed-out of ketchup 3.

The first return means 33 preferably is a prestressed coil spring which with its upper end at inner parts of the outer sealing ring 21 cooperates with lower parts of the second container 14. The coil spring bears with its lower end against such parts of the valve housing 26 that are supported by lower parts of the first container 4. So positioned, the coil spring will be compressed when the second container 14 is urged downwards in order to perform feed-out or dispensing movements P2. Said feed-out movements P2 may be restricted by means of at least one such abutment surface 37 of the second container 14 that abuts against lower parts of the downwardly tapering members of the first container 4.

For the fixation of the valve housing 26 on the inner piston 22, the valve housing 26 comprises an elastic material or consists, preferably in its entirety, of elastic material and has a perforated end wall 36 which can be caused to snap in behind the enlarged end portion 23 of the inner piston 22. Furthermore, said end wall 36 is so shaped that it permits sliding on the inner piston 22 above the enlarged end portion 23 thereof.

The check valves 30 and the outer check valves 32 suitably consist of parts of elastic material that are comprised in the valve housing 26 and extend downwardly therefrom. Furthermore, said parts are preferably of such a shape that they bear, in closed positions, against the inside of the discharge member 10 of the first container 4 and, in opened positions, are folded inwardly from said inside.

By being in a prestressed condition, the first return means 33 locates the second container 14 in a start position (FIG. 1) at which said second container 14 via the control means 15 from below engages or bears against support portions 38 provided at the top of the first container 4.

The inner piston 22 cooperates with a second return means 39 which is intended, after feed-out of mustard 2, to impart returning movements R1 to the inner piston 22 in a direction towards a start position. This return means 39 preferably consists of a coil spring which is located within the second container 14 and more exactly between lower portions 40 of the second container 14 and a lock means 41 provided on upper parts of the inner piston 22. Said lock means 41 can be located so that the coil spring is slightly prestressed when the inner piston 22 is in its start position. When returning movements R1 are imparted to the inner piston 22, said inner piston will move out of the dispensing chamber 28 of the valve housing 26, which means that the check valve 30 is brought into closing position and that a negative pressure is generated in the feed-out chamber 28, since the enlarged end portion 23 slides tightly against the valve housing 26. This negative pressure in the discharge or feed-out chamber 28 results in mustard 2 being sucked into said feed-out chamber 28 when the enlarged end portion 23 has moved so far out of the feed-out chamber 28 that the mouths of the throughflow passages 24 are no longer obstructed by the valve housing 26. Thus, mustard 2 will be sucked from upper parts of the second container 14, through the throughflow passage 24 and the throughflow gap 29 formed in the throughflow chamber 27 around the enlarged end portion and down into the feed-out chamber 28 until the latter is filled with mustard 2 for the next dispensing operation.

A motion transfer means 42 is provided on the dispensing handle 5 for transferring the dispensing or feed-out movements P of the dispensing handle 5 to either the second container 14 (for feed-out only of said second liquid product; here ketchup 3) or the inner piston 22 (for feed-out only of said first liquid product; here mustard 2) or both (for simultaneous feed-out of said first as well as said second liquid product).

The motion transfer means 42 is preferably designed as a member which is pivotally mounted on the dispensing handle 5. This member preferably protrudes or projects through a hole in the dispensing handle 5 and includes above said hole a grip portion 43 for easy holding and rotation with one hand.

In the illustrated embodiment, the motion transfer means 42 can be set in four different dispensing positions A–D and can in each of these positions cooperate with the second container 14 or the inner piston 22 with one of four different, downwardly directed motion transfer portions 42A, 42B, 42C and 42D.

The motion transfer portion 42A preferably has a centrally in downward direction mounted tongue 44 for being able to press down the inner piston 22 but not the second container 14. The motion transfer portion 42B has a downwardly directed portion 45 which is designed for being capable of pressing or pushing down the second container 14 and the inner piston 22 at the same time. The motion transfer portion 42C has two outer tongues 46 for pressing down the second container 14 but not the inner piston 22 and the motion transfer portion 42D finally, has a centrally downwardly directed tongue 47 which is longer than the tongue 44 at the motion transfer portion 42A, whereby the tongue 47 can press or push down the inner piston 22 longer than the tongue 44.

The function of the four motion transfer portions 42A–42D is schematically illustrated in FIGS. 6A–6E. Thus, in FIG. 6A, the second container 14 as well as the inner piston 22 are shown in their start or initial positions. In FIG. 6B, the motion transfer means 42 has been set in a first dispensing position A, whereby the motion transfer portion 42A affects the inner piston 22 to dispense or feed out a certain amount or unit of said first product 2, i.e. here mustard. In FIG. 6C, the motion transfer means 42 has been set in a second dispensing position B, wherein the motion transfer portion 42B affects the inner piston 22 to dispense or feed out said first as well as said second product 2 and 3, i.e. here mustard and ketchup, simultaneously. In FIG. 6D, the motion transfer means 42 has been set in a third dispensing position C, whereby the motion transfer portion 42C affects the second container 14 to discharge or dispense said second product 3, i.e. here ketchup. In FIG. 6E finally, the motion transfer means 42 has been set in a fourth dispensing position D, whereby the motion transfer portion 42D affects the inner piston 22 to dispense a larger amount or unit of said first product 2, i.e. here mustard, than at the feed-out with the motion transfer portion 42A of FIG. 6B.

The embodiment of the invention illustrated in the drawings and described above may vary within the scope of the following claims regarding the design and location of the various members. The motion transfer means 42 can e.g. have a totally different shape than what is shown. The dispenser can of course be used for other liquid food products than mustard and ketchup.

I claim:

1. Dispenser for manually feeding out at least a first and a second liquid product on food products, comprising:

a first container for containing one liquid product and having an inner wall and an outer discharge space, a second container having an outer wall and a valve housing and movably provided substantially within the first container for containing an other liquid product, the second container being movable between a return position and a dispensing position, an outer sealing means located on the outer wall of the second container, said sealing means sealingly engaging the inner wall of the first container when said second container is moved into a dispensing position to feed or press out, while sealingly engaging the first container, such units of said one liquid product in the outer discharge space in said first container, an inner piston movably provided within the second container, the inner piston being movable between a return position and a dispensing position to feed or press out, while sealingly or tightly engaging the walls of the valve housing of the second container, such units of said other liquid product gathered in a lower discharge or feed-out chamber in the valve housing of the second container, the outer sealing means when moved to the return position, cooperating with means for admitting units of said one of the liquid products into the outer discharge space, at least one of the inner piston and the valve housing cooperating with means to admit units of said other liquid product into the lower discharge or feed-out chamber in said valve housing, when said inner piston is moved from the dispensing position to the return position, wherein the second chamber and the inner piston are movable relative to each other, means for moving the second chamber from a return position to a dispensing position without moving the inner piston from a return position to a dispensing position so that only units of said one liquid product can be dispensed, means for moving the inner piston from a return position to a dispensing position without moving the second container from a return position to a dispensing position so that only units of said other liquid product can be dispensed, and means for moving the second container and the inner piston from respective return positions to respective dispensing positions at the same time so that units of said one liquid as well as said other liquid product can be dispensed simultaneously.

2. Dispenser according to claim 1, wherein at least one of the inner piston and the second container have dispensing movements between a return position and a dispensing position of different amounts for dispensing various amounts of at least one of said first and second liquid products.

3. Dispenser according to claim 1, wherein the first container has a dispensing handle which effects dispensing movements between a return position and a dispensing position which can be transferred to at least one of the second container and the inner piston.

4. Dispenser according to claim 3, wherein the dispensing handle includes at least one motion transfer means which can be set in at least a first dispensing position for transferring the dispensing movements of the dispensing handle to the inner piston only, whereby the motion transfer means can be set in at least a second dispensing position for transferring the dispensing movements of the dispensing handle to the second container as well as to the inner piston, and whereby the motion transfer means can be set in at least a third dispensing position for transferring the dispensing movements of the dispensing handle to the second container only.

5. Dispenser according to claim 4, wherein the motion transfer means can be set in a fourth dispensing position for imparting larger dispensing movements to at least one of the inner piston and the second container than when said motion transfer means is set in one of the other dispensing positions.

6. Dispenser according to claim 4, wherein the motion transfer means includes at least two motion transfer portions and that said motion transfer means can be set in at least two dispensing positions in order to impart dispensing movements onto at least one of the second container and the inner piston through the dispensing handle, to the second container only.

7. Dispenser according to claim 6, wherein that the motion transfer means is engaged in an opening in the dispensing handle, which handle defines a lid to the first container.

8. Dispenser according to claim 6, wherein the motion transfer means includes four motion transfer portions, and the motion transfer means can be set in four dispensing positions.

9. Dispenser according to claim 3, whereby the dispensing handle is pivotally mounted on the first container such that it can be brought to perform dispensing movements (P) and whereby said dispensing handle is designed as a lid to the first container, and the size of the dispensing movements of the dispensing handle in a direction towards the second container and the inner piston is limited by upper members of the first container.

10. Dispenser according to any preceding claim 1, wherein the second container cooperates with at least a first return means having the shape of a coil spring, which coil spring is slightly prestressed when it holds the second container in a start or initial position and whereby said coil spring is stressed so dispensing movements are imparted onto the second container such that said coil spring can impart returning movements onto said second container in a direction towards its start or initial position.

11. Dispenser according to claim 1, further comprising:
a second return means, wherein the inner piston cooperates with at least the second return means which is biased so the inner piston effects dispensing movements such that said second return means imparts returning movements onto the inner piston in a direction towards a return position.

12. Dispenser according to claim 11, wherein the second return means is a coil spring.

13. Dispenser according to claim 11, wherein the second return means is provided within the second container and is slightly prestressed when the second return means maintains the inner piston in the start or initial position.

* * * * *

UNITED STATES PATENT AND TRADEMARK OFFICE
CERTIFICATE OF CORRECTION

PATENT NO.   : 5,749,495
DATED        : May 12, 1998
INVENTOR(S)  : Leif Einar Stern It is certified that error appears in the above-indentified patent and that said Letters Patent is hereby corrected as shown below:

On the cover page,

Item [73] Assignee: line 1, delete "Aspect" and insert --Asept--.

Signed and Sealed this

Fifteenth Day of September, 1998

Attest:

BRUCE LEHMAN

Attesting Officer  Commissioner of Patents and Trademarks